United States Patent
Cheng

(10) Patent No.: US 8,446,126 B2
(45) Date of Patent: May 21, 2013

(54) POWER BANK APPARATUS WITH SPEAKER

(75) Inventor: Yu-Hung Cheng, Chung-Ho (TW)

(73) Assignee: Cooler Master Co., Ltd., New Taipei (TW)

( * ) Notice: Subject to any disclaimer, the term of this patent is extended or adjusted under 35 U.S.C. 154(b) by 356 days.

(21) Appl. No.: 12/849,910

(22) Filed: Aug. 4, 2010

(65) Prior Publication Data

US 2012/0032531 A1 Feb. 9, 2012

(51) Int. Cl.
*H02J 7/00* (2006.01)
*H04R 5/02* (2006.01)

(52) U.S. Cl.
USPC ........... 320/116; 320/124; 320/135; 320/139; 381/300; 381/332; 381/26; 381/28; 381/59

(58) Field of Classification Search
USPC ........................................... 320/116
See application file for complete search history.

(56) References Cited

U.S. PATENT DOCUMENTS

| | | | | |
|---|---|---|---|---|
| D320,018 S | * | 9/1991 | Bakanowsky, III | D14/172 |
| 5,545,935 A | * | 8/1996 | Stewart | 307/150 |
| 6,233,343 B1 | * | 5/2001 | Muranami et al. | 381/96 |
| 6,813,528 B1 | * | 11/2004 | Yang | 700/94 |
| 7,508,171 B2 | * | 3/2009 | Carrier et al. | 320/138 |
| 7,668,571 B2 | * | 2/2010 | Na et al. | 455/569.1 |
| 2005/0218902 A1 | * | 10/2005 | Restaino et al. | 324/433 |
| 2007/0287043 A1 | * | 12/2007 | Marsh et al. | 429/23 |
| 2009/0070119 A1 | * | 3/2009 | Yoo et al. | 704/500 |
| 2010/0019724 A1 | * | 1/2010 | Mizutani et al. | 320/118 |

\* cited by examiner

*Primary Examiner* — Yalkew Fantu
(74) *Attorney, Agent, or Firm* — Chun-Ming Shih; HDLS IPR Services

(57) ABSTRACT

A power bank apparatus with speaker combines the function of power bank and the function of speaker. The power bank apparatus not only charges the portable electronic apparatuses but also supplies power to the internal speaker. The voice or music of the portable electronic apparatus is amplified by the speaker of the power bank apparatus to improve the quality of the voice or music.

9 Claims, 2 Drawing Sheets

POWER BANK APPARATUS WITH SPEAKER

BACKGROUND OF THE INVENTION

1. Field of the Invention

The present invention relates to a power bank apparatus and in particular to a power bank apparatus with speaker.

2. Description of Prior Art

A variety of portable electronic apparatuses in the present day (for example notebooks, cellular phones or MP3 players etc.) all need batteries to power on when users use them outdoor without indoor electricity. Thus the users have to charge the batteries of the portable electronic apparatuses before the power of the battery in use going out, and have to bring a plurality of batteries for long time using. It is very inconvenient.

To solve the inconvenience mentioned above, the power banks are invented. The users only have to charge the power bank then connect the portable electronic apparatuses to the power bank to obtain power outdoor. The users will not worry about forgetting to charge the batteries of the portable electronic apparatuses or bring a plurality of batteries.

The portable electronic apparatuses mentioned above generally have voice or music playback function. People request better quality of voice or music since science and technology is in progress everyday. Thus the portable external speakers are invented. When the users listen to the music from the portable apparatuses, the users may connect the portable apparatuses to the portable external speakers to obtain better quality of music.

When the users use, for example, an MP3 player to play music outdoor for long time, the MP3 player is connected to the power bank to obtain power and is connected to the portable external speaker to obtain better quality of music at the same time. Thus a portable electronic apparatus is necessary to connect to the power bank and the portable external speaker. It is very inconvenient.

Moreover, batteries may be the power source of the portable external speaker. However, the electricity of the batteries is easily used up, the portable external speaker then needs other external power (for example, obtain external power through USB interface). A power output port of the power bank is occupied if the portable external speaker obtains external power from the power bank (because there is no USB interface for power output in the MP3 player).

SUMMARY OF THE INVENTION

In order to solve the above-mentioned problems, an object of the present invention is to provide a power bank apparatus with speaker.

In order to solve the above-mentioned problems, another object of the present invention is to provide a power bank apparatus with speaker.

In order to achieve the object of the present invention mentioned above, the power bank apparatus with speaker of the present invention includes a microcontroller unit, a power bank charging unit electrically connected to the microcontroller unit, a power bank battery unit electrically connected to the microcontroller unit and the power bank charging unit, a discharging unit electrically connected to the power bank charging unit, a speaker unit electrically connected to the power bank battery unit, and an audio signal input unit electrically connected to the power bank battery unit.

In order to achieve another object of the present invention mentioned above, the power bank apparatus with speaker of the present invention includes a microcontroller unit, a power bank charging unit electrically connected to the microcontroller unit, a power bank battery unit electrically connected to the microcontroller unit and the power bank charging unit, a discharging unit electrically connected to the power bank charging unit, a speaker unit electrically connected to the power bank battery unit, an audio signal input unit electrically connected to the power bank battery unit, and a first-wireless transmission unit electrically connected to the audio signal input unit.

DETAILED DESCRIPTION OF THE INVENTION

Figure 1:
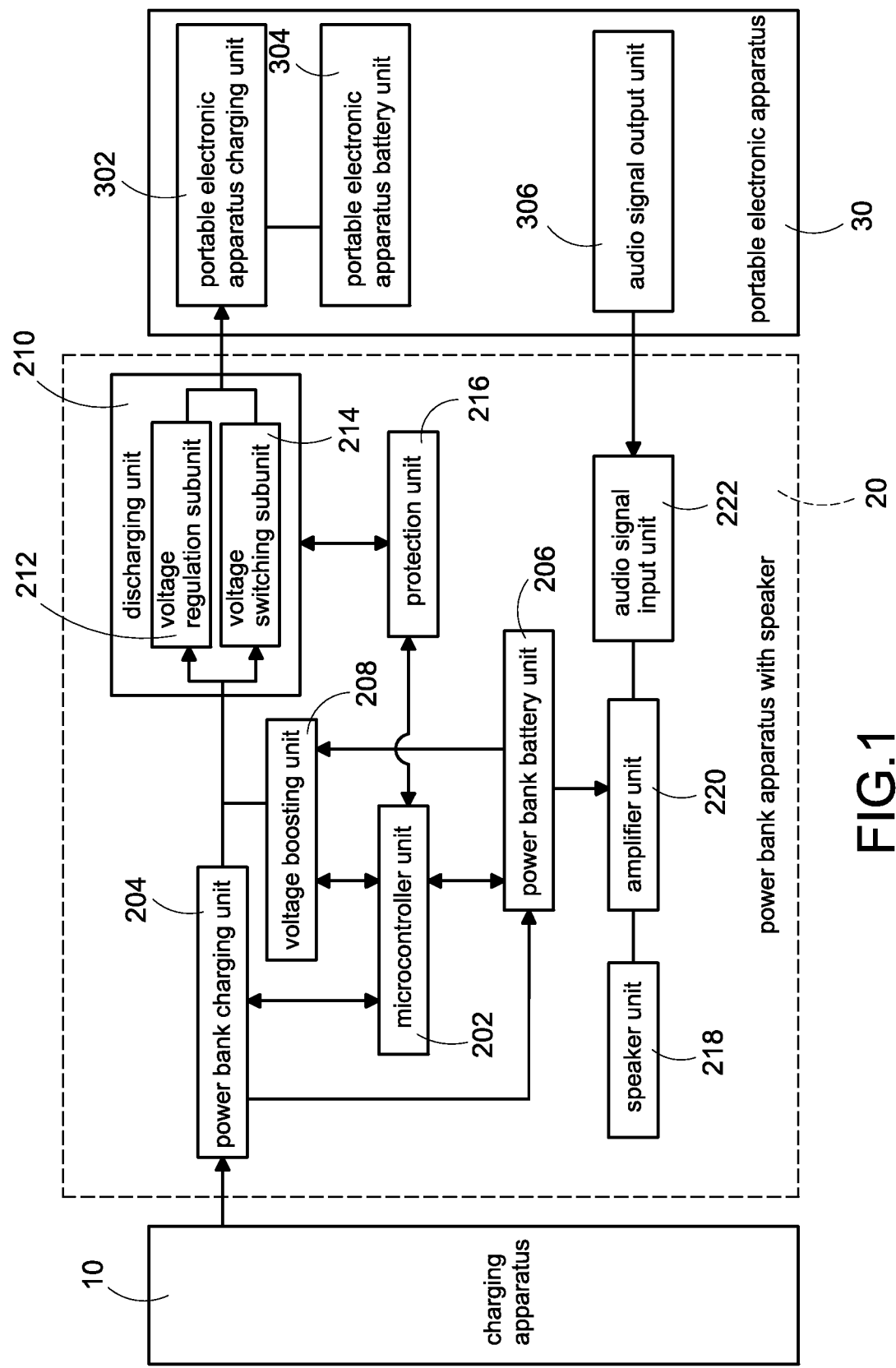
FIG. 1 shows a block diagram of an embodiment of the power bank apparatus with speaker of the present invention.

FIG. 1 shows a block diagram of the power bank apparatus with speaker according to an embodiment of the present invention. The power bank apparatus with speaker 20 of the present invention includes a microcontroller unit 202, a power bank charging unit 204, a power bank battery unit 206, a voltage boosting unit 208, a discharging unit 210, a protection unit 216, a speaker unit 218, an amplifier unit 220, and an audio signal input unit 222. The discharging unit 210 further includes a voltage regulation subunit 212 and a voltage switching subunit 214.

The power bank charging unit 204 is electrically connected to the microcontroller unit 202, the power bank battery unit 206, the voltage regulation subunit 212, the voltage switching subunit 214, and the voltage boosting unit 208. The microcontroller unit 202 is electrically connected to the power bank charging unit 204, the power bank battery unit 206, the voltage boosting unit 208, and the protection unit 216. The power bank battery unit 206 is electrically connected to the microcontroller unit 202, the power bank charging unit 204, the voltage boosting unit 208, and the amplifier unit 220. The protection unit 216 is electrically connected to the microcontroller unit 202 and the discharging unit 210. The amplifier unit 220 is electrically connected to the power bank battery unit 206, the speaker unit 218, and the audio signal input unit 222.

The power bank charging unit 204 may be a charging circuit. The voltage boosting unit 208 may be a voltage boosting circuit. The speaker unit 218 may be a speaker. The amplifier unit 220 may be an amplifier circuit. The voltage regulation subunit 212 may be a voltage regulation circuit. The voltage switching subunit 214 may be a voltage switching circuit. The power bank charging unit 204, the voltage boosting unit 208, the power bank battery unit 206, and the protection unit 216 are controlled by the microcontroller unit 202.

The power bank apparatus with speaker 20 of the present invention is applied to a charging apparatus 10 and a portable electronic apparatus 30. The charging apparatus 10 may be a laptop computer, an AC USB charger, or a DC car charger etc. The portable electronic apparatus 30 may be a laptop computer, a GPS (global positioning system) device, a cellular phone, a DVD player, a smart phone, an MP3 player, an MP4 player, or a CD player etc.

The power bank apparatus with speaker 20 is charged by the charging apparatus 10 through, for example, a USB interface. After the output power of the charging apparatus 10 is received by the power bank charging unit 204, the power bank battery unit 206 is charged by the power bank charging unit 204. The amplifier unit 220 and the voltage boosting unit 208 are supplied power by the power bank battery unit 206.

After the power supplied by the power bank battery unit 206 is boosted by the voltage boosting unit 208 and sent to the discharging unit 210, the portable electronic apparatus 30 is charged by the discharging unit 210. The voltage regulation subunit 212 is used to regulate the output voltage. The voltage switching subunit 214 is used to switch the output voltage (for example switching between 5V, 12V, and 19V) to achieve the voltage requirement of the portable electronic apparatus 30.

The power bank charging unit 204 may directly output power to the discharging unit 210 without going through the power bank battery unit 206. The protection unit 216 is used to detect the working status of the internal circuits in the power bank apparatus with speaker 20, for example, the working status of the discharging unit 210. The protection unit 216 cuts off the charging power for the portable electronic apparatus 30 if over charging, over loading, or circuits are damaged or abnormal etc.

After the output power from the power bank apparatus with speaker 20 is received by a portable electronic apparatus charging unit 302 of the portable electronic apparatus 30, a portable electronic apparatus battery unit 304 of the portable electronic apparatus 30 is charged by the portable electronic apparatus charging unit 302. The music or audio signals are sent from an audio signal output unit 306 of the portable electronic apparatus 30 to the audio signal input unit 222 of the power bank apparatus with speaker 20. The voice or the music is outputted from the speaker unit 218 after the music or audio signals are processed and amplified by the amplifier unit 220.

The transmission method for the music or audio signals transmitted from the audio signal output unit 306 to the audio signal input unit 222 is not limited to wired transmission, wireless transmission, such as Bluetooth wireless transmission technology, is also applicable. In that case wireless transmission circuits are included in the power bank apparatus with speaker 20 and the portable electronic apparatus 30 to transmit wirelessly, the detailed description is as follows.

Figure 2:
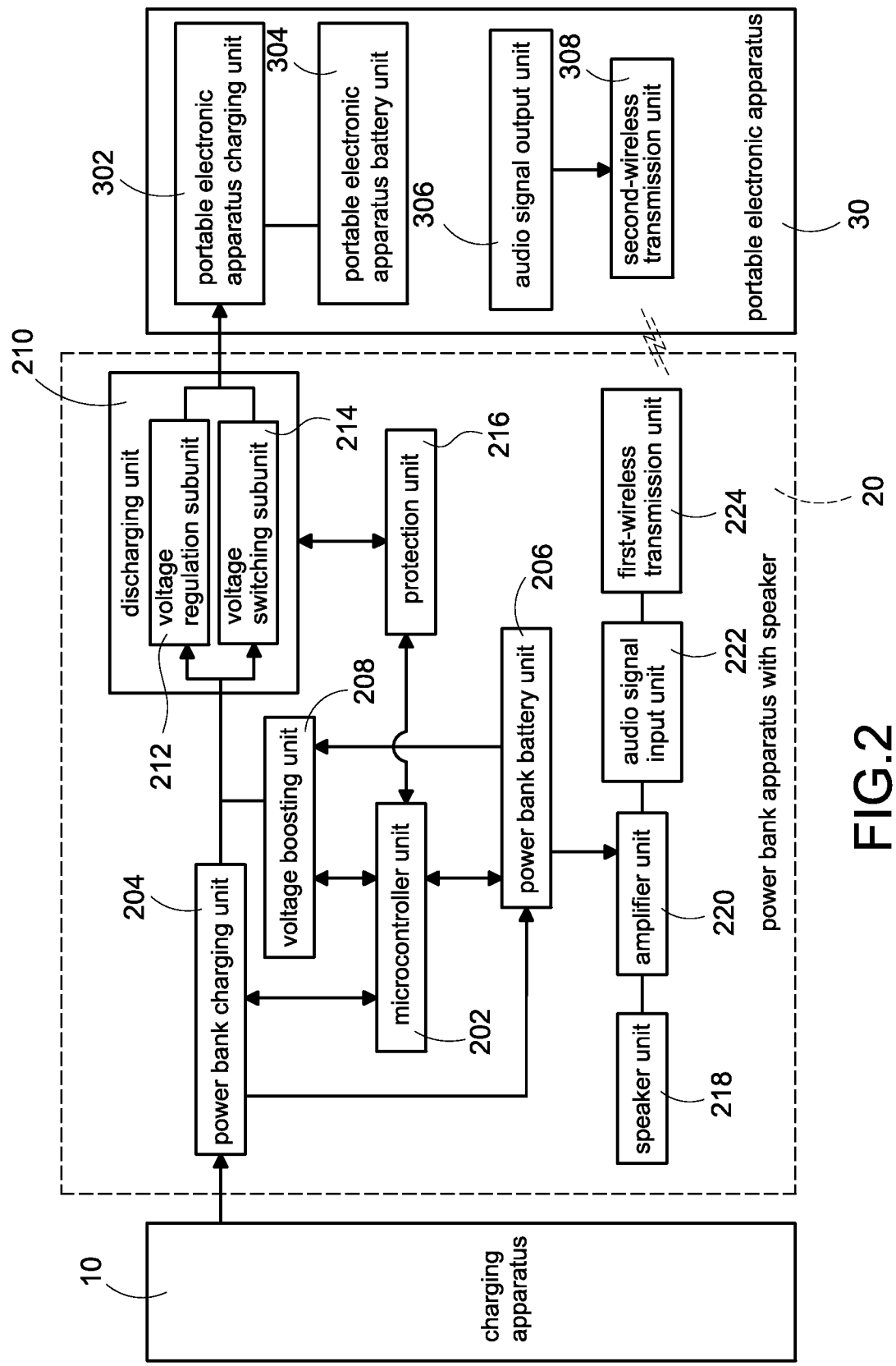
FIG. 2 shows a block diagram of another embodiment of the power bank apparatus with speaker of the present invention.

FIG. 2 shows a block diagram of the power bank apparatus with speaker according to another embodiment of the present invention. The power bank apparatus with speaker 20 of the present invention includes a microcontroller unit 202, a power bank charging unit 204, a power bank battery unit 206, a voltage boosting unit 208, a discharging unit 210, a protection unit 216, a speaker unit 218, an amplifier unit 220, an audio signal input unit 222, and a first-wireless transmission unit 224. The discharging unit 210 further includes a voltage regulation subunit 212 and a voltage switching subunit 214.

The power bank charging unit 204 is electrically connected to the microcontroller unit 202, the power bank battery unit 206, the voltage regulation subunit 212, the voltage switching subunit 214, and the voltage boosting unit 208. The microcontroller unit 202 is electrically connected to the power bank charging unit 204, the power bank battery unit 206, the voltage boosting unit 208, and the protection unit 216. The power bank battery unit 206 is electrically connected to the microcontroller unit 202, the power bank charging unit 204, the voltage boosting unit 208, and the amplifier unit 220. The protection unit 216 is electrically connected to the microcontroller unit 202 and the discharging unit 210. The amplifier unit 220 is electrically connected to the power bank battery unit 206, the speaker unit 218, and the audio signal input unit 222. The first-wireless transmission unit 224 is electrically connected to the audio signal input unit 222.

The power bank charging unit 204 may be a charging circuit. The voltage boosting unit 208 may be a voltage boosting circuit. The speaker unit 218 may be a speaker. The amplifier unit 220 may be an amplifier circuit. The voltage regulation subunit 212 may be a voltage regulation circuit. The voltage switching subunit 214 may be a voltage switching circuit. The power bank charging unit 204, the voltage boosting unit 208, the power bank battery unit 206, and the protection unit 216 are controlled by the microcontroller unit 202. The first-wireless transmission unit 224 may be for example a Bluetooth wireless transmission module etc.

The power bank apparatus with speaker 20 of the present invention is applied to a charging apparatus 10 and a portable electronic apparatus 30. The charging apparatus 10 may be a laptop computer, an AC USB charger, or a DC car charger etc. The portable electronic apparatus 30 may be a laptop, a GPS (global positioning system) device, a cellular phone, a DVD player, a smart phone, an MP3 player, an MP4 player, or a CD player etc.

The power bank apparatus with speaker 20 is charged by the charging apparatus 10 through, for example, a USB interface. After the output power of the charging apparatus 10 is received by the power bank charging unit 204, the power bank battery unit 206 is charged by the power bank charging unit 204. The amplifier unit 220 and the voltage boosting unit 208 are supplied power by the power bank battery unit 206.

After the power supplied by the power bank battery unit 206 is boosted by the voltage boosting unit 208 and sent to the discharging unit 210, the portable electronic apparatus 30 is charged by the discharging unit 210. The voltage regulation subunit 212 is used to regulate the output voltage. The voltage switching subunit 214 is used to switch the output voltage (for example switching between 5V, 12V, and 19V) to achieve the voltage requirement of the portable electronic apparatus 30.

The power bank charging unit 204 may directly output power to the discharging unit 210 without going through the power bank battery unit 206. The protection unit 216 is used to detect the working status of the internal circuits in the power bank apparatus with speaker 20, for example the working status of the discharging unit 210. The protection unit 216 cuts off the charging power for the portable electronic apparatus 30 if over charging occurs, over loading occurs, or circuits are damaged or abnormal etc.

After the output power from the power bank apparatus with speaker 20 is received by a portable electronic apparatus charging unit 302 of the portable electronic apparatus 30, a portable electronic apparatus battery unit 304 of the portable electronic apparatus 30 is charged by the portable electronic apparatus charging unit 302. The music or audio signals are sent from an audio signal output unit 306 of the portable electronic apparatus 30 to a second-wireless transmission unit 308 of the portable electronic apparatus 30, and then sent to the audio signal input unit 222 of the power bank apparatus with speaker 20 by using, for example, Bluetooth wireless transmission technology. Finally, the voice or the music is outputted from the speaker unit 218 after the music or audio signals are processed and amplified by the amplifier unit 220.

Besides, in some portable electronic apparatuses such as some cellular phones, the charging input hole and the audio signal output hole are designed as same hole. In that case the electric power and the audio signal are processed by the power bank apparatus with speaker of the present invention respectively. The charging power is sent to the portable electronic apparatus charging unit 302 and the audio signal is sent to the audio signal input unit 222.

The power bank apparatus with speaker of the present invention combines the function of power bank and the function of speaker. The power bank apparatus with speaker not only charges the portable electronic apparatuses but also supplies power to the internal speaker. The voice or music of the portable electronic apparatus is amplified by the speaker of the power bank apparatus with speaker of the present invention to improve the quality of the voice or music.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An external power bank apparatus with speaker, comprising:
    a microcontroller unit;
    a power bank charging unit electrically connected to the microcontroller unit, adapted for receiving power from a power source;
    a power bank battery unit electrically connected to the microcontroller unit and the power bank charging unit so that the power bank battery unit is charged by the power received from the power source;
    a voltage boosting unit electrically connected to the power bank charging unit, the microcontroller unit and the power bank battery unit;
    a discharging unit electrically connected to the power bank charging unit and the voltage boosting unit, adapted for connecting an individual portable electronic apparatus so that the power provided from the power source is directly applied to the portable electronic apparatus through the power bank charging unit and the discharging unit for charging a portable electronic apparatus battery unit of the portable electronic apparatus, or the power supplied by the power bank unit is boosted by the voltage boosting unit and sent to the discharging unit to supply for the portable electronic apparatus;
    a speaker unit electrically connected to the power bank battery unit, so that the power is applied to the speaker by the power bank unit; and
    an audio signal input unit electrically connected to the power bank battery unit and the speaker, adapted for connecting an audio signal output unit of the portable electronic apparatus so that music or audio signals are sent from the audio signal output unit to the audio signal input unit and voice or music is outputted from the speaker unit.

2. The power bank apparatus with speaker in claim 1, further including a protection unit electrically connected to the microcontroller unit and the discharging unit, which is used to detect a working status of the discharging unit so as to cut off the power charging for the portable electronic apparatus if overcharging or overloading is happened.

3. The power bank apparatus with speaker in claim 1, wherein the discharging unit further includes a voltage regulation subunit electrically connected to the power bank charging unit, which is used to regulate an output voltage to the portable electronic apparatus.

4. The power bank apparatus with speaker in claim 3, wherein the discharging unit further includes a voltage switching subunit electrically connected to the power bank charging unit, which is used to switch the output voltage to achieve a voltage requirement of the portable electronic apparatus.

5. The power bank apparatus with speaker in claim 1, wherein the power bank charging unit is a charging circuit.

6. The power bank apparatus with speaker in claim 1, wherein the speaker unit is a speaker.

7. The power bank apparatus with speaker in claim 3, wherein the voltage regulation subunit is a voltage regulation circuit.

8. The power bank apparatus with speaker in claim 4, wherein the voltage switching subunit is a voltage switching circuit.

9. The power bank apparatus with speaker in claim 4, wherein the output voltage is for charging a portable electronic apparatus battery unit of the portable electronic apparatus.

* * * * *